United States Patent
Lee et al.

(10) Patent No.: US 9,526,011 B2
(45) Date of Patent: Dec. 20, 2016

(54) CHANNELIZATION METHOD IN WHITESPACE BAND AND APPARATUS FOR THE SAME

(71) Applicant: LG Electronics Inc., Seoul (KR)

(72) Inventors: Wookbong Lee, Gyeonggi-do (KR); Jeongki Kim, Gyeonggi-do (KR); Jinsam Kwak, Gyeonggi-do (KR); Giwon Park, Gyeonggi-do (KR); Yongho Seok, Gyeonggi-do (KR); Jinyoung Chun, Gyeonggi-do (KR); Jinsoo Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 13/965,338

(22) Filed: Aug. 13, 2013

(65) Prior Publication Data
US 2014/0045514 A1    Feb. 13, 2014

Related U.S. Application Data

(60) Provisional application No. 61/682,323, filed on Aug. 13, 2012.

(51) Int. Cl.
*H04W 16/14*    (2009.01)

(52) U.S. Cl.
CPC ................ *H04W 16/14* (2013.01)

(58) Field of Classification Search
CPC ........... H04W 72/082; H04W 72/0406; H04W 76/023
See application file for complete search history.

(56) References Cited

U.S. PATENT DOCUMENTS

| 7,042,526 B1* | 5/2006 | Borseth | H04N 5/50 348/554 |
| 8,477,684 B2* | 7/2013 | Khandekar | H04L 1/1607 370/328 |

(Continued)

FOREIGN PATENT DOCUMENTS

| KR | 10-2012-0073294 A | 7/2012 |
| WO | 2012/015133 A1 | 2/2012 |
| WO | 2012/028764 A1 | 3/2012 |

OTHER PUBLICATIONS

IEEE P802.11ac—Draft Standard—Part 11: Wireless LAN Medium Access Control (MAC) and Physical Layer (PHY) specifications Amendment 4: Enhancements for Very High Throughput for Operation in Bands below 6 GHz, Jun. 2012.*

(Continued)

*Primary Examiner* — Qun Shen
(74) *Attorney, Agent, or Firm* — Morgan, Lewis & Bockius LLP

(57) ABSTRACT

A wireless communication system is disclosed. Specifically, a channelization method in a whitespace band and an apparatus for the same are disclosed. A method for providing whitespace operation information includes transmitting, by a first station (STA) to a second STA, a frame including a TV whitespace high throughput (TVHT) operation information field. The TVHT operation information field includes primary channel number, channel width, channel center frequency segment 0 and channel center frequency segment 1 subfields. A channel center frequency of frequency segment 0 or frequency segment 1 is determined based on a channel start frequency. The channel start frequency is determined as a function of a TV channel index corresponding to the frequency segment 0 or a TV channel index corresponding to the frequency segment 1.

11 Claims, 8 Drawing Sheets

(56) References Cited

U.S. PATENT DOCUMENTS

| | | | | |
|---|---|---|---|---|
| 8,565,194 | B2* | 10/2013 | Gorokhov | H04B 1/7103 370/335 |
| 8,879,511 | B2* | 11/2014 | Agrawal | H04W 72/14 370/335 |
| 8,893,214 | B2* | 11/2014 | Kitazato | H04H 60/43 725/148 |
| 2011/0110349 | A1* | 5/2011 | Grandhi | 370/338 |
| 2011/0258211 | A1* | 10/2011 | Kalisky | G11B 27/11 707/758 |
| 2012/0115536 | A1 | 5/2012 | Vermani et al. | |
| 2012/0115537 | A1 | 5/2012 | Gaal et al. | |
| 2012/0165056 | A1 | 6/2012 | Kim et al. | |
| 2012/0184318 | A1 | 7/2012 | Lee et al. | |
| 2012/0201213 | A1 | 8/2012 | Banerjea et al. | |
| 2012/0207106 | A1* | 8/2012 | Banerjea et al. | 370/329 |
| 2012/0219089 | A1* | 8/2012 | Murakami | H04L 25/0222 375/296 |
| 2014/0307634 | A1 | 10/2014 | Lee et al. | |

OTHER PUBLICATIONS

International Search Report and Written Opinion issued in International Patent Application No. PCT/KR2013/007234 dated Nov. 26, 2013.
Yongho Seok, "TVHT BSS Operational Proposal," IEEE P802.11-12/0894r2: Wireless LANs, Anyang, Korea, Jul. 10, 2012.
Wookbong Lee et al., "TGaf PHY proposal," IEEE P802.11-12/0809r5: Wireless LANs, Anyang, Korea, Jul. 10, 2012.
Extended European Search Report dated Sep. 9, 2016, in corresponding European Patent Application No. 13829876.5.

* cited by examiner

| Element ID | Length | TVHT Operation Information | TVHT Basic MCS Set |
|---|---|---|---|

Octets:   1   1   4   1 or 2

| Primary Channel Number | Channel Width | Channel Center Frequency Segment 0 | Channel Center Frequency Segment 1 |
|---|---|---|---|

Octets:   1   1   1   1

CHANNELIZATION METHOD IN WHITESPACE BAND AND APPARATUS FOR THE SAME

Pursuant to 35 U.S.C. §119(e), this application claims the benefit of U.S. Provisional Patent Application No. 61/682,323, filed on Aug. 13, 2012, which is hereby incorporated by reference as if fully set forth herein.

BACKGROUND OF THE INVENTION

1. Field of the Invention

The present invention relates to a wireless communication system, and more specifically, to a channelization method in a whitespace band and an apparatus for the same.

2. Discussion of the Related Art

Wireless Local Area Network (WLAN) technology standards are established by the IEEE 802.11 standards committee. IEEE 802.11a and 11b respectively provide maximum data rates of 11 Mbps and 54 Mbps using unlicensed bands of 2.4. GHz and 5 GHz. IEEE 802.11g adopts OFDM (Orthogonal Frequency Divisional Multiplexing) and provides maximum data rates of 54 Mbps. IEEE 802.11n adopts MIMO-OFDM and provides maximum data rates of 300 Mbps for 4 spatial streams. IEEE 802.11n supports up to 40 MHz channel bandwidth and provides maximum data rates of 600 Mbps.

IEEE 802/11af standard for defining operations of unlicensed devices in the TV whitespace (TVWS) band is currently under development.

TVWS includes VHF (Very High Frequency) bands (54 to 60, 76 to 88 and 174 to 216 MHz) and UHF (Ultra High Frequency) bands (470 to 698 MHz) allocated for TV broadcast and refers to a frequency band permitted for use by an unlicensed device under the condition that communications of licensed devices (devices for TV broadcast, wireless microphones, etc.) operating in the corresponding frequency bands are not hindered.

While operations of all unlicensed devices are permitted in the range of 512 to 608 MHz and 614 to 698 MHz except for some special cases, 54 to 60 MHz, 76 to 88 MHz, 174 to 216 MHz and 470 to 512 MHz are permitted for communication between fixed devices only. A fixed device refers to a device performing transmission at a fixed location only. In the following description, while the TVWS band includes the above-mentioned TVWS, the present invention is not limited thereto.

An unlicensed device that wants to use TV whitespace band needs to provide a licensed device protection function. Accordingly, the unlicensed device must check whether a licensed device occupies the corresponding TV band before starting transmission in the TV whitespace band. That is, the unlicensed device is permitted for use in the whitespace band only when the licensed device is not used in the whitespace band.

To achieve this, the unlicensed device needs to access a geo-location database (GDB) through the Internet or a dedicated network to obtain information about a list of channels available in a corresponding area. The geo-location database stores and manages information about licensed devices registered therein and information about channels dynamically changed according to geographical positions of the licensed devices and time for which the licensed devices are used. To solve a problem of coexistence of unlicensed devices using the whitespace, a signaling protocol such as a common beacon frame and a spectrum sensing mechanism can be used.

In IEEE 802.11, a TVWS terminal can refer to an unlicensed device operating in the TVWS spectrum using an IEEE 802.11 medium access control (MAC) layer and physical (PHY) layer. In the specification, a station (STA) refers to a TVWS terminal operating in the TVWS spectrum unless otherwise mentioned.

STA needs to provide a function of protecting an incumbent user or a primary user allowed to perform incumbent access including a licensed user (TV user, wireless microphone, etc.). That is, when an incumbent user is using the TVWS, STA has to stop use of the TVWS. Accordingly, STA needs to detect an available channel (channel that is not used by licensed devices) that can be used by unlicensed devices and operate in the available channel.

STA can detect an available channel through spectrum sensing mechanism or by accessing the GDB to determine a TV channel schedule. Energy detection (method of determining that an incumbent user is using TVWS when the intensity of a received signal is higher than a predetermined value) and feature detection (method of determining that an incumbent user is using TVWS when a digital TV preamble is detected) can be used as the spectrum sensing mechanism. In addition, STA needs to access the GDB to acquire GDB information based on the position thereof to check whether a licensed device uses a channel in the position. STA should access the GDB and acquire the information with sufficient frequency to protect the licensed device.

When it is determined that an incumbent user is using a channel immediately adjacent to the currently used channel through the spectrum sensing mechanism or GDB, a terminal (or STA) and a base station (or access point (AP)) can protect the incumbent user by reducing transmit power.

SUMMARY OF THE INVENTION

Accordingly, the present invention is directed to a channelization method in a whitespace band and an apparatus for the same that substantially obviates one or more problems due to limitations and disadvantages of the related art.

An object of the present invention is to provide a method for setting a channel for WLAN operation in the whitespace band correctly and efficiently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing whitespace operation information includes: a first station (STA) transmitting a frame including a TV whitespace high throughput (TVHT) operation information field to a second STA. The TVHT operation information field may include primary channel number, channel width, channel center frequency segment 0 and channel center frequency segment 1 subfields. A channel center frequency of frequency segment 0 or frequency segment 1 may be determined based on a channel start frequency. The channel start frequency may be determined as a function of a TV channel index corresponding to the frequency segment 0 or a TV channel index corresponding to the frequency segment 1.

In another aspect of the present invention, provided herein is a method for receiving whitespace operation information, including: a second STA receiving a frame including a TVHT operation information field from a first STA. The TVHT operation information field may include primary channel number, channel width, channel center frequency segment 0 and channel center frequency segment 1 subfields. A channel center frequency of frequency segment 0 or frequency segment 1 may be determined based on a channel start frequency. The channel start frequency may be determined as a function of a TV channel index corresponding to the frequency segment 0 or a TV channel index corresponding to the frequency segment 1.

In another aspect of the present invention, provided herein is an STA device providing whitespace operation information, including: a transceiver; and a processor, wherein the processor is configured to control the STA device to transmit a frame including a TVHT operation information field to another STA device using the transceiver. The TVHT operation information field may include primary channel number, channel width, channel center frequency segment 0 and channel center frequency segment 1 subfields. A channel center frequency of frequency segment 0 or frequency segment 1 may be determined based on a channel start frequency. The channel start frequency may be determined as a function of a TV channel index corresponding to the frequency segment 0 or a TV channel index corresponding to the frequency segment 1.

In another aspect of the present invention, provided herein is an STA device receiving whitespace operation information, including: a transceiver; and a processor, wherein the processor is configured to control the STA device to receive a frame including a TVHT operation information field from another STA device using the transceiver. The TVHT operation information field may include primary channel number, channel width, channel center frequency segment 0 and channel center frequency segment 1 subfields. A channel center frequency of frequency segment 0 or frequency segment 1 may be determined based on a channel start frequency. The channel start frequency may be determined as a function of a TV channel index corresponding to the frequency segment 0 or a TV channel index corresponding to the frequency segment 1.

The following may be commonly applied to the above aspects of the present invention.

The channel start frequency may be set to the center frequency of a TV channel corresponding to a 0-th TV channel index on the basis of the TV channel index corresponding to the frequency segment 0 or the TV channel index corresponding to the frequency segment 1.

The TV channel index corresponding to the frequency segment 0 or the TV channel index corresponding to the frequency segment 1 may be the index of a lowest TV channel in the frequency segment 0 or frequency segment 1.

When the channel width corresponds to a basic channel unit (BCU), two contiguous BCUs or four contiguous BCUs, the channel center frequency segment 0 subfield may be set to a value indicating a lowest TV channel index for a channel including the BCU, two contiguous BCUs or four contiguous BCUs, on which a TVHT basic service set (BSS) operates.

When the channel width corresponds to one of two non-contiguous BCUs or two non-contiguous frequency segments, the channel center frequency segment 0 subfield may be set to a value indicating a lowest TV channel index for a channel including a BCU or two contiguous BCUs of the frequency segment 0 in which a TVHT BSS operates. Each frequency segment may include two contiguous BCUs.

The frequency segment 0 may be a frequency segment including a primary channel.

When the channel width corresponds to one of two non-contiguous BCUs or two non-contiguous frequency segments, the channel center frequency segment 1 subfield may be set to a value indicating a lowest TV channel index for a channel including a BCU or two contiguous BCUs of the frequency segment 1 in which a TVHT BSS operates.

The frequency segment 1 may be a frequency segment that does not include a primary channel.

The channel center frequency may be defined as Channel center frequency=Channel start frequency+TVHT_W× dot11CurrentChannelCenterFrequencyIndex+ChannelCenterFrequencyCorrection. Herein, 'channel center frequency' may be the center frequency of a channel, 'channel start frequency' may be the start frequency of the channel, TVHT_W may denote a BCU, 'dot11CurrentChannelCenterFrequencyIndex' may be the TV channel index corresponding to the frequency segment 0 or the TV channel index corresponding to the frequency segment 1, and 'ChannelCenterFrequencyCorrection' may be a predetermined correction value.

The predetermined correction value may be 0 when a PPDU (Physical layer convergence procedure (PLCP) Protocol Data Unit) is transmitted using a BCU or two non-contiguous BCUs.

The predetermined correction value may be 0.5× TVHT_W when the PPDU is transmitted using two contiguous BCUs or two non-contiguous frequency segments.

The predetermined correction value may be 1.5× TVHT_W when the PPDU is transmitted using four contiguous BCUs.

The TVHT operation information field may have a size of 4 octets. Each of the primary channel number, channel width, channel center frequency segment 0 and channel center frequency segment 1 subfields may have a size of 1 octet.

The first STA may be an access point (AP) STA and the second STA may be a non-AP STA.

It is to be understood that both the foregoing general description and the following detailed description of the present invention are exemplary and explanatory and are intended to provide further explanation of the invention as claimed.

The present invention can provide a method for setting a channel for WLAN operation in the whitespace band correctly and efficiently.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
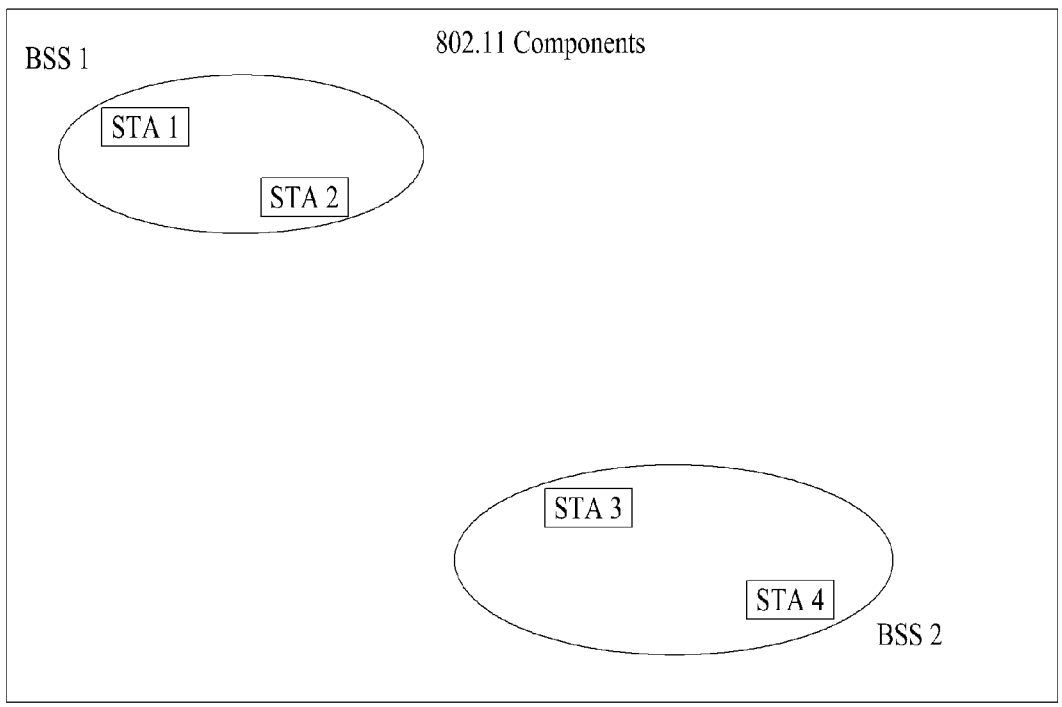
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
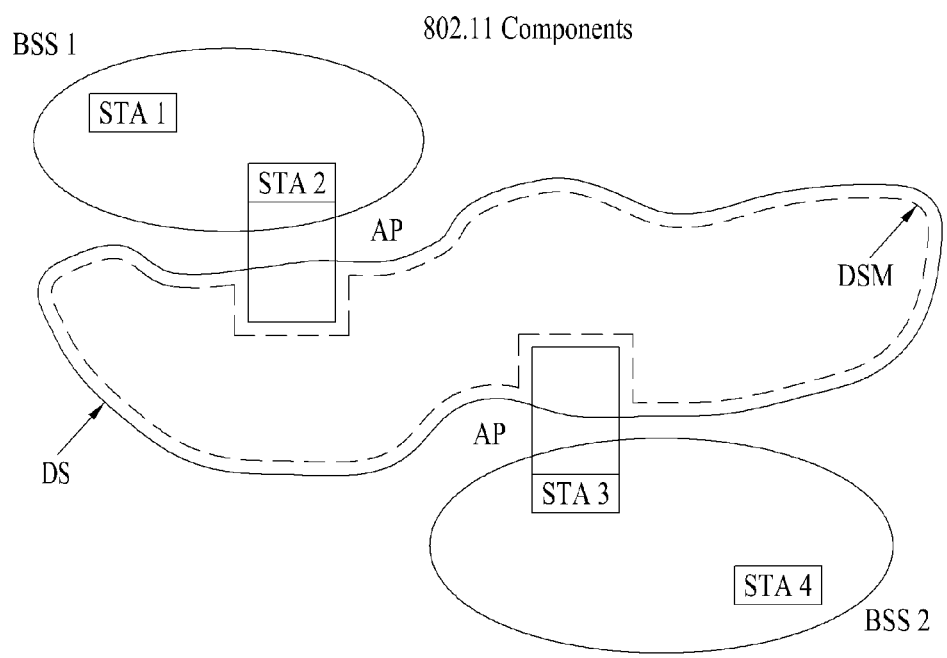
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
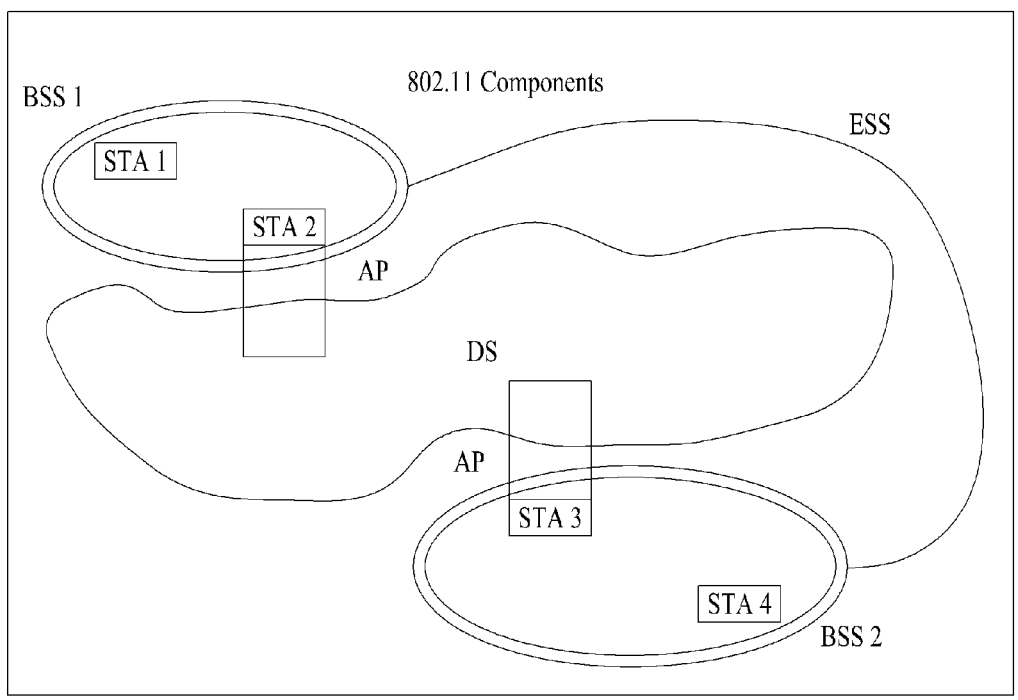
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and an ESS. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
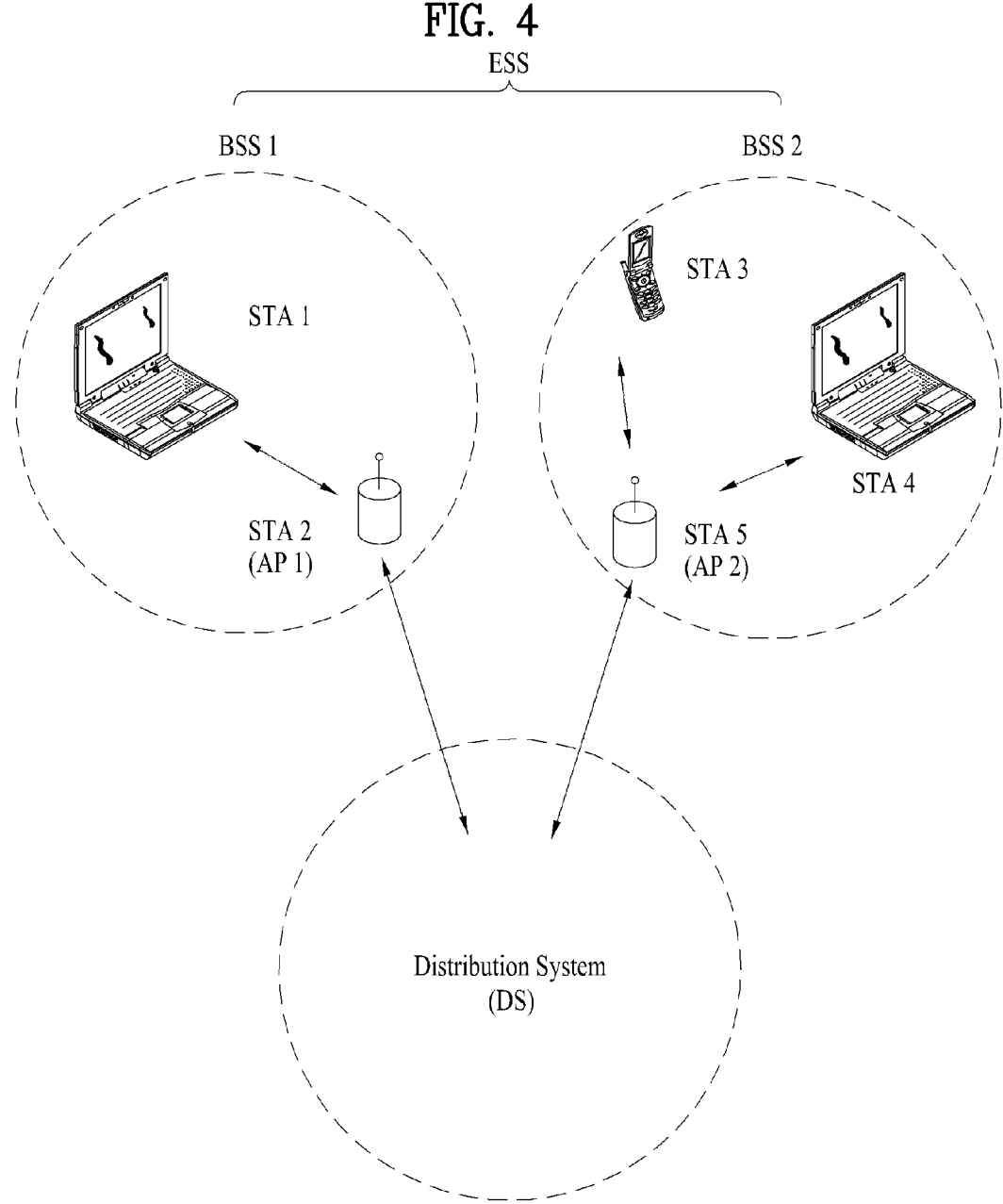
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc in other wireless communication fields.

Available Channel in Whitespace

For operation of an STA in whitespace, it is necessary to preferentially provide protection of a licensed device (or incumbent user). Accordingly, the STA needs to find an available channel that is not used by the licensed device and thus can be used by an unlicensed device and to operate on the available channel. If the channel used by the STA is no longer available, utilization of the channel is stopped.

To check channel (e.g. TV channel) availability in the whitespace (e.g. TVWS), the STA can perform spectrum sensing or access a GDB to find out a TV channel schedule. GDB information may include information on a specific channel use schedule (i.e. channel use time) of the licensed device at a specific position. The STA that wants to check availability of a TV channel needs to access the GDB through the Internet to acquire GDB information based on location information thereof. This operation needs to be performed at an interval sufficient to protect the licensed device.

In the specification, information on available channels and frequencies, received from the GDB, is called a whitespace map (WSM). The WSM is a map of information on channels available for unlicensed devices in the TVWS based on channel and frequency information obtained by an STA from the GDB. The WSM may include information on an available channel list or frequencies that can be used by unlicensed devices. Channels included in the available channel list are channels that are not used by signals (or users) that need to be legally protected and can be used by an unlicensed device when the unlicensed device accesses the GDB. When an unlicensed device requests an available channel after a predetermined lapse of time from when the unlicensed device accesses the GDB, the WSM may include information on channels and frequencies which are available from the corresponding time. Alternatively, when the unlicensed device requests an available channel to the GDB, it is possible to transmit information on available channels and frequencies by signaling channels that cannot be used by the unlicensed device.

FCC (Federal Communications Commission) TVWS regulations currently define two device types. That is, a personal/portable device with low power and a fixed device with high power, which operates at a fixed position. The fixed device may be referred to as a fixed STA and the personal/portable device may be referred to as a P/P STA. The fixed STA and P/P STA may correspond to normal STAs (that is, STAs including an AP and a non-AP) in the WLAN system. When the devices of two types operate in the TVWS, different operation rules may be applied thereto. The fixed device transmits/receives signal at a specific position that is not varied. The fixed device needs to access the GDB to acquire information on available channels to transmit a signal at the specific position. While the fixed device may include a positioning device such as a GPS, an installer can directly input the position of the fixed device to transmit the location information of the fixed device to the GDB. When the installer directly inputs the position of the fixed device, the fixed device is operated on the assumption that once the fixed device is installed and the position thereof is input, the position does not change. When the position of the fixed device is changed, the changed position needs to be registered. The fixed device may serve another fixed device of the same type and the P/P device. When the fixed device receives information on available channels from the GDB, the fixed device needs to transmit information on the device type thereof and receive information on available channels that can be directly used thereby. To serve the P/P device, the fixed device needs to additionally acquire information on available channels that can be used by the P/P device from the GDB or a proxy server connected to the GDB. This is because the fixed device and the P/P device use different channel intervals and operate with different maximum allowable transmit powers and different requirements for neighboring channels and thus the respective device types require different available channel lists. For example, the fixed device is permitted to transmit a signal at 512 to 608 MHz and 614 to 698 MHz as well as at 54 to 60 MHz, 76 to 88 MHz, 174 to 216 MHz and 470 to 512 MHz, whereas the P/P device is not allowed to transmit a signal in TVWS bands other than 512 to 608 MHz and 614 to 698 MHz. The fixed device can transmit a signal with higher power than the P/P device and up to 4 watts is permitted for the fixed device as effective isotropic radiated power (EIRP).

The P/P device can transmit/receive signals at a position that is not fixed and the position thereof can be changed. The P/P device can be carried by a person and mobility thereof cannot be predicted. The available frequency band of the P/P device is 512 to 608 MHz and 614 to 698 MHz and maximum transmit power thereof is 100 mW (EIRP). That is, the allowable transmit power of the P/P device is limited compared to the fixed device.

The P/P device can be categorized into a mode II device and a mode I device according to whether or not the P/P device has identification capability, that is, geo-location capability and capability of accessing the GDB through the Internet. The mode II device has geo-location capability and GDB access capability and can access the GDB to acquire information about available channels at the location thereof and then operate in the TVWS at the corresponding location. In addition, the mode II device can acquire the available channel information from the GDB and then initiate communication through a network by transmitting a signal (e.g. enable signal) for instructing communication to be initiated to the mode I device. The mode I device need not have the geo-location capability or GDB access capability and operates under the control of the mode II device or a fixed device. The mode I device can acquire available channel information from the mode II device of fixed device and needs to periodically check validity of available channels. In addition, the mode I device can be permitted to operate on an available channel upon confirmation of the device ID thereof. Here, the mode II device or fixed device may correspond to an enabling STA and the mode I device may correspond to a dependent STA. An enabling signal transmitted from the enabling STA to the dependent STA may correspond to a beacon frame.

A P/P device corresponding to the mode II device can provide a service to another P/P device or fixed device. In this case, the mode II P/P device can acquire available channel information for the fixed device from the GDB and deliver the available channel information to the fixed device.

The GDB can calculate available channel information at a location requested by an unlicensed device and transmit the information to the unlicensed device in consideration of a channel use schedule and protection contour of an incumbent user such as a DTV or microphone. Parameters considered by the GDB when the GDB calculates the available channel information include a device type, operation location, transmit power and spectrum mask. In the FCC regulations, whether or not to use a neighboring channel depends on device type. For example, when a DTV receiver is used on channel #30, the fixed device cannot use channels #29 and #31 even if channels #29 and #31 are not occupied but the P/P device can use the two channels. This is because the possibility that the fixed device interferes with a neighboring channel is high since the fixed device has high transmit power.

While exemplary embodiments of the present invention will be described hereinafter using the TVWS as an exemplary whitespace for convenience, the scope of the present invention is not limited thereto. That is, the scope of the present invention includes exemplary embodiments of the present invention, which are applied to operations in all whitespaces controlled by a DB that provides information on available channels at a specific position. For example, it is expected to permit operation of an unlicensed device, controlled by the GDB, in frequency bands that do not currently correspond to the whitespace but are expected to become whitespace and exemplary embodiments of the present invention applied thereto can be included within the scope of the present invention. Furthermore, while the principle of the present invention is described on the basis of FCC regulations for the TVWS, the scope of the present invention is not limited to operations in whitespace according to the FCC regulations and includes exemplary embodiments of the present invention, which are implemented on whitespaces conforming to other regulations.

A description will be given of an exemplary process through which a mode I device operating in the whitespace acquires available channel information from a mode II device or a fixed device.

Figure 5:
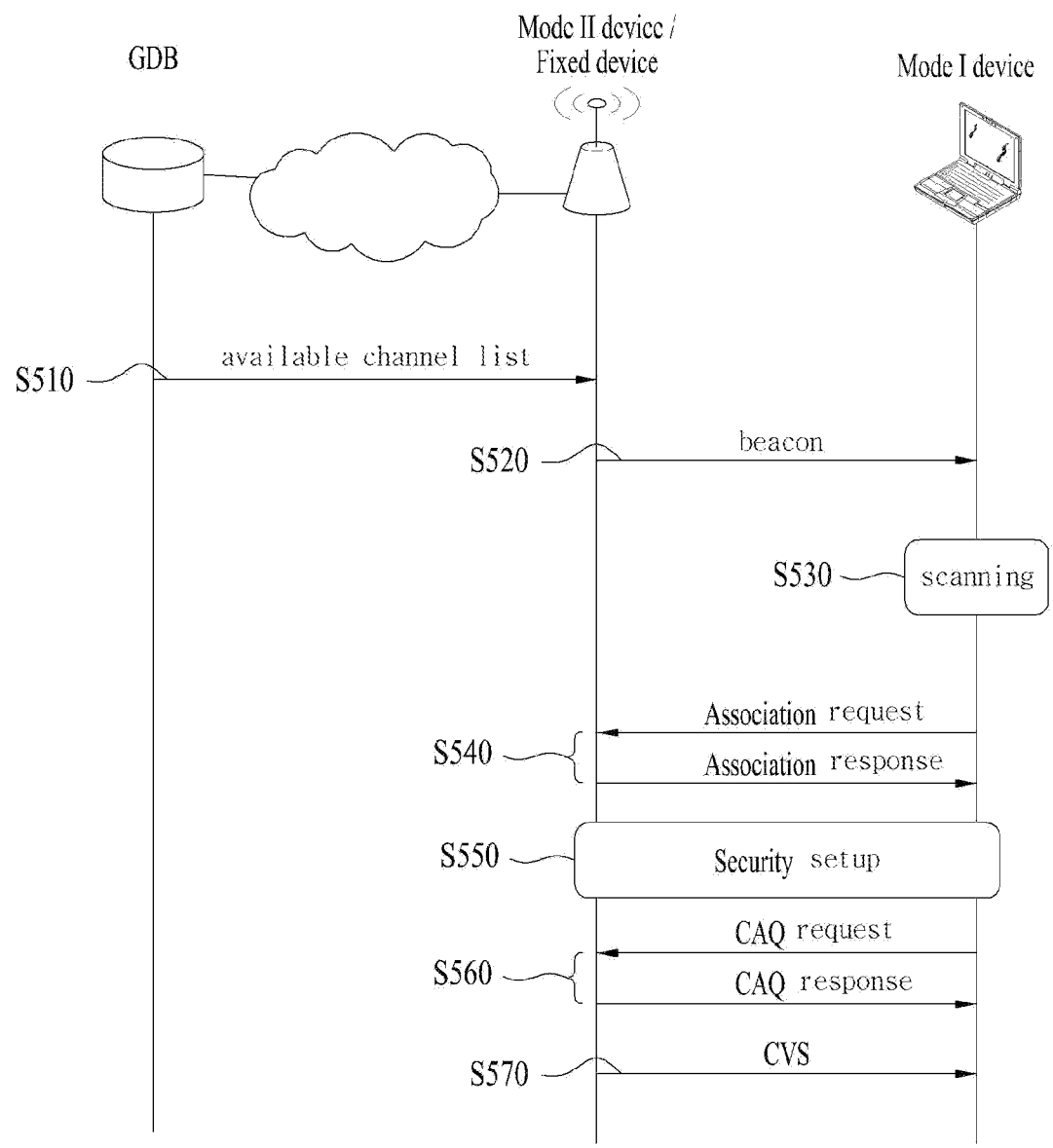
FIG. 5 is a flowchart illustrating an exemplary link setup procedure according to an embodiment of the present invention.

FIG. 5 is a flowchart illustrating an exemplary link setup procedure according to an embodiment of the present invention.

The mode II device or fixed device (represented as mode II device/fixed device hereinafter) can access the GDB through the Internet or the like to acquire a list (e.g. WSM) of available channels that can be used in the current location thereof in step S510.

The mode II device/fixed device can transmit a beacon frame to configure a BSS in step S520. The beacon frame may include information on the available channel list, etc. The beacon frame may be periodically transmitted.

A mode I device that wants to participate in the BSS can scan the TVWS in step S530. If the mode I device knows the available channel list that can be used at the current location thereof, the mode I device can perform passive or active scanning only on channels belonging to the available channel list. Passive scanning refers to a process through which the mode I device listens for transmission of the beacon frame from the mode II device/fixed device on a scanning channel. Active scanning refers to a process through which the mode I device transmits a probe request frame and receives a probe response frame from the mode II device/fixed device on the scanning channel.

To participate in the BSS, the mode I device needs to operate under the control of the mode II device/fixed device. Accordingly, the mode I device needs to perform link setup with the mode II device/fixed device.

The mode I device can perform association after the scanning process in order to participate in the BSS in step S540. To achieve this, the mode I device can transmit an association request frame to the mode II device/fixed device.

Upon successful association request/response, security setup is performed in step S550. For example, security setup can include a private key setup process through 4-way handshaking using an extensible authentication protocol over LAN (EAPOL) frame. Security setup must be performed between the mode II device/fixed device and the mode I device because integrity check is required when the mode II device/fixed device transmits a WSM to the mode I device.

Upon completion of security setup, The mode I device can request the mode II device/fixed device to provide an available channel list (e.g. WSM) by transmitting a channel availability request frame (or channel availability query (CAQ) request frame) to the mode II device/fixed device in step S560. The mode II device/fixed device can provide the available channel list (e.g. WSM) to the mode I device by transmitting a channel availability response frame (or CAQ response frame) to the mode I device. The mode I device can complete link setup with the mode II device/fixed device by receiving the available channel list (e.g. WSM) from the mode II device/fixed device. Upon completion of link setup, the mode I device can initiate transmission/reception of data, control and management frames, etc. to/from the mode II device/fixed device.

TVWS Physical Layer (PHY) Operation

A description will be given of an operation of converting a data unit (e.g. physical layer convergence procedure (PLCP) service data unit (PSDU)), provided from a MAC layer to a PHY layer, into a signal transmitted on a wireless medium (i.e. data transmission operation) and an operation of converting the signal transmitted on the wireless medium into the PSDU (i.e. data reception operation).

In particular, there is a need for a method for configuring a channel (referred to as a WLAN channel, WLAN operation channel or operation channel to be distinguished from TV channels, hereinafter) for a communication system (e.g. WLAN) operating in the TVWS. A TV channel available for a TVWS device may depend on the position of the device. To support operations of the TVWS device even when contiguous TV channels cannot be used at the corresponding frequency, a method for configuring a contiguous or non-contiguous operation channels can be considered.

Furthermore, it is possible to support a high throughput (HT) operation of a WLAN in the TVWS, which is called TVHT operation.

In the present invention, a bandwidth of a basic unit constituting a TVHT operation channel is represented as W MHz. The basic unit constituting the TVHT operation channel may be called a basic channel unit (BCU). The bandwidth W of the BCU can be defined based on TV channel bandwidth. For example, the U.S. and Korea define a TV channel of 6 MHz, Australia and New Zealand define a TV channel of 7 MHz and Europe defines a TV channel of 8 MHz. Accordingly, the value of W MHz can be defined as one of 6, 7 and 8 MHz according to regulatory domain.

A frequency segment or a frequency section refers to one or more contiguous frequency unit. For example, when 2 BCUs are contiguously configured for TVHT operation, the 2 contiguous BCUs can be called a frequency segment.

When W=6, for example, an operation channel (i.e. W=6 MHz channel) composed of one BCU, an operation channel (i.e. 2W=12 MHz channel) composed of 2 contiguous BCUs, and an operation channel (i.e. 4W=24 MHz channel) composed of 4 contiguous BCUs can be defined. In addition, an operation channel (i.e. W+W=6+6 MHz channel) composed of 2 non-contiguous BCUs and an operation channel (i.e. 2W+2W=12+12 MHz channel) composed of 2 non-contiguous frequency segments each of which includes contiguous BCUs can be defined.

In the following description, a primary channel refers to a common operation channel for all STAs belonging to a BSS. For example, the primary channel is used for transmission of a data unit (e.g. PLCP protocol data unit (PPDU)) and may be used for transmission of a basic signal such as a beacon. That is, the primary channel corresponds to a basic channel of STA operation.

A secondary channel is a channel associated with the primary channel and used to support a wide bandwidth and high throughput by being combined with the primary channel.

For example, the location of a primary channel from 2 W MHz channels constituting a 2W MHz channel needs to be determined. The location of the primary channel can indicate whether the primary channel corresponds to a high frequency part or a low frequency part of the 2 W MHz channels. In the present invention, the primary channel is defined in the TVWS in which an available TV channel varies with time or STA location. Specifically, the primary channel defined in configuration of a TVWS operation channel according to the present invention can be set in consideration of available TV channels in the TVWS.

Figures 6, 7, 8:
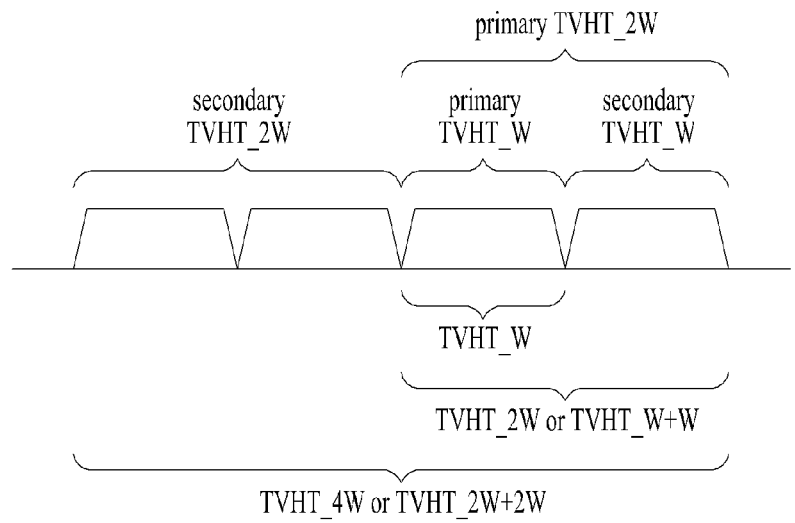
FIG. 6 illustrates a TVHT channel-list parameter element and a channel bandwidth.
FIG. 7 illustrates a TVHT operation element format according to the present invention.
FIG. 8 illustrates a TVHT operation information field format.

FIG. 6 illustrates a TVHT channel-list parameter element and a channel bandwidth.

The channel-list parameter element is information on clear channel assessment (CCA) of a STA. CCA refers to an operation of checking whether a wireless medium is busy or not. The channel-list parameter element can be used when the STA indicates whether a corresponding channel is a primary channel or a secondary channel when performing CCA.

Elements such as primaryTVHT_W, primaryTVHT_2W, secondaryTVHT_W and secondaryTVHT_2W can be defined in the TVHT channel-list parameter element. Here, TVHT_W may correspond to a BCU and TVHT_2W may correspond to 2 contiguous BCUs.

Definition (i.e. channelization) of an operation channel for a system operating in the TVWS can be determined based on available TV channels (TV channels in which an incumbent user is not present). For example, when contiguous TV channels are not available (i.e. TV channels n−1 and n+1 are not available although TV channel n is available) or contiguous TV channels are available, channelization for a TVWS system can be determined in consideration of how many contiguous TV channels are available.

Configuration information about an operation channel determined based on available TV channels can be provided by an enabling STA to a dependent STA or provided by an AP STA to a non-AP STA. For example, the configuration information on the operation channel can include a channel start frequency, channel width, channel center frequency index (center frequency index of a BCU including a primary channel and a center frequency index of a BCU that does not include a primary channel), primary channel position, etc. Here, the channel start frequency can be defined by operating class information. Information on the channel width (e.g. W, 2W, 4W, W+W, 2W+2W, etc.) can be defined by operation channel information elements. The channel center frequency index and the primary channel position can be defined by a physical layer management entity management information base (PLME MIB).

A description will be given of embodiments of channelization for WLAN operation in the TVWS according to the present invention, particularly, embodiments of channelization for TVHT operation.

TVHT Operation Element

FIG. 7 illustrates a TVHT operation element format according to the present invention.

Operations of TVHT STAs in a BSS can be controlled by a TVHT operation element. As shown FIG. 7, the format of the TVHT operation element may include an element ID field, a length field, a TVHT operation information field and a TVHT basic modulation and coding (MCS) set field.

The element ID field of FIG. 7 may have a value corresponding to an ID indicating that a corresponding information element is the TVHT operation element.

The length field of FIG. 7 may have a value indicating the size of fields following the length field and can be set to 6 octets in the example of FIG. 7.

The TVHT operation information field of FIG. 7, may include primary channel number, channel width, channel center frequency segment 0 and channel center frequency segment 1 subfields.

FIG. 8 illustrates a format of the TVHT operation information field. The subfields of the TVHT operation information field proposed by the present invention can be defined as shown in Table 1.

example, in the case of a TVHT_2W or TVHT_4W operation channel width, the value of the channel center frequency segment 0 field corresponds to the frequency of the WLAN operation channel. In this case, when a correction value (i.e. ChannelCenterFrequencyCorrection) of Equation 4 is applied, an incorrect value corresponding to the sum of the center frequency of the WLAN operation channel and the correction value is represented as the center frequency of the WLAN operation channel.

Similarly, the value of the channel center frequency segment 0 field corresponds to the center frequency of frequency segment 0 (i.e. frequency segment including a primary channel) in the case of a TVHT_2W+2W operation channel width, and thus an incorrect value corresponding to the sum of the center frequency of frequency segment 0 and the correction value of Equation 4 is represented as the center frequency of the frequency segment.

Accordingly, the present invention defines the channel center frequency segment (i.e. dot11CurrentChannelFrequencyIndex0 or dot11CurrentChannelCenterFrequencyIndex1 of Table 4 which will be shown below) as an index indicating the center

TABLE 1

| Field | Definition | Encoding |
| --- | --- | --- |
| Primary channel number | This field indicates the channel number of a primary channel. | Channel number of the primary channel |
| Channel width | This field defines a BSS operation channel width. | Set to 0 for TVHT_W operation channel width. Set to 1 for TVHT_2W operation channel width. Set to 2 for TVHT_W + W operation channel width. Set to 3 for TVHT_4W operation channel width. Set to 4 for TVHT_2W + 2W operation channel width. Values in the range of 5 to 255 are reserved. |
| Channel center frequency segment 0 | This field defines a channel center frequency for TVHT BSSs of TVHT_W, TVHT_2W and TVHT_4W. | Index indicating the center frequency of a lowest TV channel with respect to a TVHT_W, TVHT_2W or TVHT_4W channel on which a TVHT BSS operates for a TVHT_W, TVHT_2W or TVHT_4W operation channel width |
| | This field defines segment 0 channel center frequency for TVHT BSSs of TVHT_W + W and THVT_2W + 2W. | Index indicating the center frequency of a lowest TV channel with respect to a TVHT_W or TVHT_2W channel of frequency segment 0 in which a TVHT BSS operates for a TVHT_W + W or TVHT_2W + 2W operation channel width Reserved otherwise. |
| Channel center frequency segment 1 | This field defines segment 1 channel center frequency for TVHT BSSs of TVHT_W + W and THVT_2W + 2W. | Index indicating the center frequency of a lowest TV channel with respect to a TVHT_W or TVHT_2W channel of frequency segment 1 in which a TVHT BSS operates for a TVHT_W + W or TVHT_2W + 2W operation channel width Reserved otherwise. |

In related arts, channel center frequency segment 0 indicates the center frequency (i.e. the center frequency of a WLAN operation channel) of a TVHT_W, TVHT_2W or TVHT_4W channel on which a TVWS BSS operates in the case of a TVHT_W, TVHT_2W or TVHT_4W operation channel width or indicates the center frequency of a frequency segment including a primary channel in the case of a TVHT_W+W or TVHT_2W+2W operation channel width. Furthermore, channel center frequency segment 1 indicates the center frequency of a frequency segment that does not include a primary channel in the case of a TVHT_W+W or TVHT_2W+2W operation channel width.

The center frequency of a WLAN operation channel can be represented/calculated according to Equation 4. For frequency of the "lowest" TV channel from among TV channels belonging to the WLAN operation channel. Therefore, the center frequency of the WLAN operation channel can be correctly represented according to Equation 4. Detailed description will be given below in relation to Equation 4.

The TVHT basic MCS set field of FIG. 7 indicates an MCS for the number of spatial streams of TVHT PPDUs supported by all TVHT STAs in the BSS. The TVHT basic MCS set field can be defined as an 8-bit bitmap. Every 2 bits of the 8-bit bitmap indicate an MCS supported for Nss (the number of spatial streams, which can be one of 1 to 4). The TVHT basic MCS set field may be defined as B0 to B7 of a receive (Rx) MCS map subfield (one of subfields of a VHT supported MCS set field). In this case, the TVHT basic MCS set field can be defined as 1 octet (i.e. 8 bits). However, the present invention is not limited thereto and the TVHT basic MCS set field can be defined as 2 octets (i.e. 16 bits) including 8 bits in addition to the 8-bit bitmap.

TVHT BSS Operation

An STA that generates a BSS needs to receive and transmit signals according to a MCS value defined in an MCS set (i.e. TVHTBSSBasicMCSSet) basically supported by the TVHT BSS and an MCS set (i.e. TVHTOperationalMCSSet) supported for TVHT operation.

A TVHT AP announces channel width capability supported thereby in a supported channel width set subfield of a TVHT capability information field of a TVHT capability element.

In addition, the TVHT AP sets the channel width subfield of the TVHT operation information field of the TVHT operation element such that the channel width subframe indicates a BSS operating channel width. For example, the TVHT AP can indicate one of W, 2W, W+W, 4W and 2W+2W as the BSS operating channel width.

The bandwidth of a PPDU transmitted from the BSS may be a subset of the BSS operating channel width. For example, when the BSS operating bandwidth is 2W, a supported PPDU bandwidth may be W or 2W. When the BSS operating bandwidth is W+W, the supported PPDU bandwidth may be W or W+W. If the BSS operating bandwidth is 4W, the supported PPDU bandwidth may be one of W, 2W and 4W. When the BSS operating bandwidth is 2W+2W, the supported PPDU bandwidth may be one of W, 2W or 2W+2W.

Accordingly, in order to correctly indicate the PPDU bandwidth, additional information is needed in addition to the BSS operating channel width.

Here, the PPDU may include a PLCP preamble field, a PLCP header field and a data field. The PLCP preamble field includes a training field. The PCLP header field includes a signal (SIG) field. The data field includes a PLCP service data unit (PSDU). The SIG field included in the PLCP header field includes a bandwidth (BW) field. The BW field is defined as 2 bits. A conventional BW field indicates a PPDU bandwidth of X (e.g. X=20 MHz), 2X, 4X or 8X/4X+4X.

In the TVHT PPDU, the SIG field of the PLCP header field can be composed of TVHT-SIG-A1 and TVHT-SIG-A2 and the first 2 bits (B0 and B1) of TVHT-SIG-A1 can be defined as the BW field.

To correctly indicate the PPDU bandwidth, the present invention proposes a method of using the BW field of TVHT-SIG-A1 along with the BSS operating bandwidth.

Table 2 shows the TVHT BSS operating channel width. As shown in Table 2, the type of the transmitted PPDU can be determined depending on the BSS operating channel width and B0 and B1 of the TVHT-SIG-A1 field.

TABLE 2

| TVHT operation element channel width field | BSS operating channel width | B0 and B1 (BW) in TVHT-SIG-A1 | PPDU type |
|---|---|---|---|
| 0 | TVHT_W | 1 | TVHT_MODE_1 |
| 1 | TVHT_2W | 1 | TVHT_MODE_1 |
|  |  | 2 | TVHT_MODE_2C |
| 2 | TVHT_W + W | 1 | TVHT_MODE_1 |
|  |  | 2 | TVHT_MODE_2N |

TABLE 2-continued

| TVHT operation element channel width field | BSS operating channel width | B0 and B1 (BW) in TVHT-SIG-A1 | PPDU type |
|---|---|---|---|
| 3 | TVHT_4W | 1 | TVHT_MODE_1 |
|  |  | 2 | TVHT_MODE_2C |
|  |  | 3 | TVHT_MODE_4C |
| 4 | TVHT_2W + 2W | 1 | TVHT_MODE_1 |
|  |  | 2 | TVHT_MODE_2C |
|  |  | 3 | TVHT_MODE_4N |

In Table 2, TVHT_MODE_1 PPDU corresponds to a TVHT_W VHT PPDU or a TVHT_W NON_HT PPDU. Here, the TVHT_W NON_HT PPDU refers to replicating a non-HT PPDU twice in a BCU (i.e. TVHT_W bandwidth).

TVHT_MODE_2C PPDU corresponds to a TVHT_2W VHT PPDU or a TVHT_2W NON_HT PPDU. Here, the TVHT_2W NON_HT PPDU refers to replicating a non-HT PPDU four times in two contiguous BCUs (i.e. TVHT_2W bandwidth).

TVHT_MODE_2N PPDU corresponds to a TVHT_W+W VHT PPDU or a TVHT_W+W NON_HT PPDU. Here, the TVHT_W+W NON_HT PPDU refers to replicating a non-HT PPDU four times in two non-contiguous BCUs (i.e. TVHT_W+W bandwidth).

TVHT_MODE_4C PPDU corresponds to a TVHT_4W VHT PPDU or a TVHT_4W NON_HT PPDU. Here, the TVHT_4W NON_HT PPDU refers to replicating a non-HT PPDU eight times in four contiguous BCUs (i.e. TVHT_4W bandwidth).

TVHT_MODE_4N PPDU corresponds to a TVHT_2W+2W VHT PPDU or a TVHT_2W+2W NON_HT PPDU. Here, the TVHT 2W+2W NON_HT PPDU refers to replicating a non-HT PPDU eight times in a bandwidth (i.e. TVHT_2W+2W bandwidth) including two non-contiguous frequency segments each of which includes two contiguous BCUs.

When a TVHT non-AP STA receives a frame including the TVHT operation element, the TVHT non-AP STA can determine channelization using "channel center frequency segment 0" and "channel center frequency segment 1" subfields of the TVHT operation information field (refer to Table 1) and "primary channel offset". Channelization will be described in more detail below.

A TVHT STA, a member of a TVHT BSS, can operate not to transmit TVHT_MODE_1 PPDU on channels other than the primary TVHT_W channel of the BSS except for transmission of TVHT_MODE_1 PPDU on an off-channel tunneled direct-link setup (TDLS) direct link (that is, the TVHT STA can operate to transmit TVHT_MODE_1 PPDU only on the primary TVHT_W channel of the BSS). Here, an off-channel refers to a channel other than a base channel and the base channel refers to a channel through which a TDLS peer STA associates with an AP.

A TVHT STA, a member of a TVHT BSS having a TVHT_2W, TVHT_4W or TVHT_W+W operating channel width, can operate not to transmit TVHT_MODE_2C or TVHT_MODE_2N PPDU that does not use the primary TVHT_W channel and secondary TVHT_W channel of the BSS except for transmission of TVHT_MODE_2C, TVHT_MODE_4C or TVHT_MODE_2N PPDU on the off-channel TDLS direct link.

A TVHT STA, a member of a TVHT BSS having a TVHT_4W or TVHT_2W+2W operating channel width, can operate not to transmit TVHT_MODE_4C or TVHT_MODE_4N PPDU that does not use the primary TVHT_2W channel and secondary TVHT_2W channel of the BSS except for transmission of TVHT_MODE_4C or TVHT_MODE_4N PPDU on the off-channel TDLS direct link.

A TVHT STA can operate not to transmit a PPDU to another TVHT STA using a bandwidth that is not indicated by a TVHT capability element recently received from the other TVHT STA or a supported channel width set subfield of an operating mode notification frame.

An STA can operate not to transmit a PPDU for which CH_BANDWIDTH parameter of TXVECTOR indicates a wider channel bandwidth than the BSS operating channel width except for a case of the TDLS off-channel direct-link. Here, TXVECTOR refers to a list of parameters provided by MAC to PHY for PSDU transmission and the CH_BANDWIDTH parameter from among the parameters indicates a channel width used for packet transmission.

Mathematical Representation of Signals

For all TVHT PPDU transmission modes, a signal is transmitted on a subcarrier defined in Table 3. Table 3 shows a tone location.

TABLE 3

| Parameter | TVHT_MODE_1 | TVHT_MODE_2C | TVHT_MODE_2N | TVHT_MODE_4C | TVHT_MODE_4N | Description |
|---|---|---|---|---|---|---|
| $N_{ST}$ | 114 | 114 | 114 | 114 | 114 | The number of subcarriers occupied per BCU |
| $N_{TT}$ | 114 | 228 | 228 | 456 | 456 | The number of subcarriers occupied by all BCUs |
| Subcarrier index | [−58 to −2] and [+2 to +58] | [−130 to −74], [−70 to −14], [+14 to +70] and [+74 to +130] | [−58 to −2] and [+21 to +58] for each BCU | [−274 to −218], [−214 to −158], [−130 to −74], [−70 to −14], [+14 to +70], [+74 to +130], [+158 to +214] and [+_218 to +274] | [−130 to −74], [−70 to −14], [+14 to +70] and [+74 to +130] for each BCU | Position of a subcarrier occupied by a 6 MHz/8 MHz channel |
| Subcarrier index | [−58 to −2] and [+2 to +58] | [−58 to −2] and [+2 to +58] for each BCU | [−58 to −2] and [+2 to +58] for each BCU | [−310 to −254], [−250 to −194], [−142 to −86], [−82 to −26], [+26 to +82], [+86 to +142], [+194 to +250] and [+254 to +310] | [−142 to −86], [−82 to −26], [+26 to +82] and [+87 to +142] for each BCU | Position of a subcarrier occupied by a 7 MHz channel |

A TVHT channel is defined by physical layer management entity (PLME) management information base (MIB) fields defined in Table 4.

TABLE 4

| Field | Meaning |
|---|---|
| dot11CurrentChannelWidth | This field indicates a channel width (this field can have values of TVHT_W, TVHT_2W, TVHT_W + W, TVHT_4W and TVHT_2W + 2W). |
| dot11CurrentChannelCenterFrequencyIndex0 | This field represents an index indicating the center frequency of the lowest TV channel in TVHT_MODE_1, TVHT_MODE_2C and TVHT_MODE_4C operations. This field represents an index indicating the center frequency of the lowest TV channel of a frequency segment including a primary channel in TVHT_MODE_2N and TVHT_MODE_4N operations. The valid range is 1 to 200. |
| dot11CurrentChannelCenterFrequencyIndex1 | This field represents an index indicating the center frequency of the lowest TV channel of a frequency segment including no primary channel in TVHT_MODE_2N and TVHT_MODE_4N operations. |

TABLE 4-continued

| Field | Meaning |
|---|---|
| | The valid range is 1 to 200.<br>This field is not defined in TVHT_MODE_1, TVHT_MODE_2C and TVHT_MODE_4C operations. |
| dot11CurrentPrimaryChannel | This field indicates the position of a primary TVHT_W channel.<br>The valid range is 1 to 200. |

As described above with reference to Table 1, the present invention defines the channel center frequency segment (i.e. dot11CurrentChannelCenterFrequencyIndex0 or dot11CurrentChannelCenterFrequencyIndex1 of Table 4) as an index indicating the center frequency of the "lowest" TV channel from among TV channels included in the corresponding WLAN operation channel.

Variables can be defined as shown in Table 5 to mathematically represent a channel frequency.

TABLE 5

| Variables | Meaning |
|---|---|
| $f_{c,\,idx0}$ | dot11CurrentChannelCenterFrequencyIndex0 (refer to Table 4) |
| $f_{c,\,idx1}$ | dot11CurrentChannelCenterFrequencyIndex1 (refer to Table 4) |
| $f_{PW,\,idx}$ | dot11CurrentPrimaryChannel (refer to Table 4) |
| $f_{CH,\,start}$ | Channel start frequency |

In Table 5, the channel start frequency $f_{CH,start}$ is determined according to a value defined in country information and operating classes (refer to Tables 9 to 12).

When the variables are defined as shown in Table 5, $f_{c,idx}$ and $f_{c,idx0}$ have the relationship therebetween, which is specified by Equation 1, in TVHT_MODE_1, TVHT_MODE_2C, TVHT_MODE_2N, TVHT_MODE_4C or TVHT_MODE_4N operation (otherwise, $f_{c,idx}$ and $f_{c,idx0}$ have the relationship therebetween, which is specified by Equation 1, when dot11CurrentChannelWidth corresponds to TVHT_W, TVHT_2W, TVHT_W+W, TVHT_4W or TVHT_2W+2W).

[Equation 1]

$$f_{P20,idx} = f_{c,idx0} - 4 \cdot \left(\frac{N_{20\,MHz}}{2} - n_{P20}\right) + 2 \quad (\#43)$$

$$f_{PW,idx} = f_{c,idx0} + n_{PW}$$

In Equation 1, $$f_{P20,idx} = f_{c,idx0} - 4 \cdot \left(\frac{N_{20\,MHz}}{2} - n_{P20}\right) + 2 \quad (\#43\text{-}1)$$

$$0 \leq n_{PW} \leq N_{PW}.$$

$N_{PW}$ is determined as follows. $N_{PW}=1$ in case of TVHT_MODE_1 and TVHT_MODE_2N (or TVHT_W and TVHT_W+W). $N_{PW}=2$ in case of TVHT_MODE_2C and TVHT_MODE_4N (or TVHT_2W and TVHT_2W+2W). $N_{PW}=4$ in case of TVHT_MODE_4C (or TVHT_4W).

A description will be given of mathematical representation of frequency characteristics (e.g. frequency positions) of the primary channel and secondary channel according to TVHT operating mode or TVHT channel width.

In a TVHT-MODE_1, TVHT_MODE_2C, TVHT_MODE_2N, TVHT_MODE_4C or TVHT_MODE_4N operation (or when 'dot11CurrentChannelWidth' corresponds to TVHT_W, TVHT_2W, TVHT_W+W, TVHT_4W or TVHT_2W+2W), a primary TVHT_W channel is a channel having a TVHT_W bandwidth with a center frequency of $f_{CH,start}+W \times f_{PW,idx}$. Here, $f_{PW,idx}$ is determined according to Equation 1.

In a TVHT-MODE_2C, TVHT_MODE_4C or TVHT_MODE_4N operation (or when 'dot11CurrentChannelWidth' corresponds to TVHT_2W, TVHT_4W or TVHT_2W+2W), a secondary TVHT_W channel is a channel having a TVHT_W bandwidth with a center frequency Of $f_{CH,start}+W \times f_{SW,idx}$. Here, $f_{SW,idx}=f_{PW,idx}+1$ when $n_{PW}$ is an even number and $f_{SW,idx}=f_{PW,idx}-1$ when $n_{PW}$ is an odd number.

In a TVHT-MODE_2N operation (or when 'dot11CurrentChannelWidth' corresponds to TVHT_W+W), the secondary TVHT_W channel is a channel having a TVHT_W bandwidth with a center frequency of $f_{CH,start}+W \times f_{SW,idx}$. Here, $f_{SW,idx}=f_{c,idx1}$ (refer to Table 5).

In a TVHT-MODE_2C, TVHT_MODE_4C or TVHT_MODE_4N operation (or when 'dot11CurrentChannelWidth' corresponds to TVHT_2W, TVHT_4W or TVHT_2W+2W), the primary TVHT_W channel is a channel having a TVHT_W bandwidth with a center frequency of $f_{CH,start}+W \times f_{P2W,idx}+0.5 \times W$. Here, $f_{P2W,idx}$ is determined according to Equation 2.

$$f_{P2W,idx} = f_{c,idx0} + 2 \times n_{P2W} \quad \text{[Equation 2]}$$

In Equation 2, $$f_{P20,idx} = f_{c,idx0} - 4 \cdot \left(\frac{N_{20\,MHz}}{2} - n_{P20}\right) + 2 \quad (\#43\text{-}1)$$

$$0 \leq n_{P2W} \leq N_{P2W}.$$

$N_{P2W}$ is determined as follows. $N_{PW}=1$ in case of TVHT_MODE_2C and TVHT_MODE_4N (or TVHT_2W and TVHT_2W+2W). $N_{PW}=2$ in case of TVHT_MODE_4C (or TVHT_4W).

In a TVHT-MODE_2C, TVHT_MODE_4C or TVHT_MODE_4N operation (or when 'dot11CurrentChannelWidth' corresponds to TVHT_2W, TVHT_4W or TVHT_2W+2W), a secondary TVHT_2W channel is a channel having a TVHT_2W bandwidth with a center frequency of $f_{CH,start}+W \times f_{S2W,idx}+0.5 \times W$. Here, $f_{S2W,idx}=f_{P2W,idx}+2$ when $n_{P2W}$ is an even number and $f_{S2W,idx}=f_{P2W,idx}-2$ when $n_{P2W}$ is an odd number.

In a TVHT-MODE_4C operation (or when 'dot11CurrentChannelWidth' corresponds to TVHT_4W), the secondary TVHT_2W channel is a channel having a TVHT_2W bandwidth with a center frequency of $f_{CH,start}+W \times f_{S2W,idx}+0.5 \times W$. Here, $f_{S2W,idx}=f_{P2W,idx}+2$ when $n_{P2W}$ is an even number and $f_{S2W,idx}=f_{P2W,idx}-2$ when $n_{P2W}$ is an odd number.

In a TVHT-MODE_4N operation (or when 'dot11CurrentChannelWidth' corresponds to TVHT_2W+2W), the secondary TVHT_2W channel is a channel having a TVHT_2W bandwidth with a center frequency of $f_{CH,start}+W \times f_{2SW,idx}+0.5 \times W$. Here, $f_{SW,idx}=f_{c,idx1}$ (refer to Table 5).

A transmitted signal is described by complex baseband signal notation. The transmitted signal is associated with a complex baseband signal according to the relationship defined by Equation 3.

$$r_{RF}^{(i_{Seg}, i_{TX})}(t) = \text{Re}\left\{\frac{1}{\sqrt{N_{Seg}}} r_{PPDU}^{(i_{Seg}, i_{TX})}(t) \exp\left(j2\pi f_c^{(i_{Seg})} t\right)\right\},$$
$$i_{Seg} = 0, \ldots, N_{Seg}-1; i_{TX} = 1, \ldots, N_{TX}$$
[Equation 3]

In Equation 3, Re{X} denotes the real part of a complex value X, $N_{seg}$ denotes the number of frequency segments of the transmitted signal, $r_{PPDU}^{(i_{Seg}, i_{TX})}(t)$ represents a complex baseband signal of a frequency segment $i_{Seg}$ at a transmit antenna $i_{TX}$, and $f_c^{(i_{Seg})}$ represents the center frequency of part of a PPDU transmitted in the frequency segment $i_{Seg}$.

In TVHT_MODE_2C and TVHT_MODE_4C, a gap between center frequencies of adjacent frequency segments is as shown in Table 3.

As shown Table 6, $f_c^{(i_{Seg})}$ can be represented as a function of dot11CurrentChannelBandwidth. Table 6 shows the center frequency of a PPDU transmitted in the frequency segment $i_{Seg}$.

TABLE 6

| dot11CurrentChannelBandwidth | CH_BANDWIDTH | $f_c^{(iSeg)} = f_{CH,start} + W \times f_{(i_{Seg})}$ + Correction | |
|---|---|---|---|
| | | ($f_{(0)}$, Correction) | ($f_{(1)}$, Correction) |
| TVHT_W | TVHT_W | ($f_{c,idx0}$, 0) | — |
| TVHT_2W | TVHT_W | ($f_{PW,idx}$, 0) | — |
| | TVHT_2W | ($f_{c,idx0}$, 0.5 × W) | — |
| TVHT_W + W | TVHT_W | ($f_{PW,idx}$, 0) | — |
| | TVHT_W + W | ($f_{c,idx0}$, 0) | ($f_{c,idx1}$, 0) |
| TVHT_4W | TVHT_W | ($f_{PW,idx}$, 0) | — |
| | TVHT_2W | ($f_{P2W,idx}$, 0.5 × W) | — |
| | TVHT_4W | ($f_{c,idx0}$, 1.5 × W) | — |
| TVHT_2W + 2W | TVHT_W | ($f_{PW,idx}$, 0) | — |
| | TVHT_2W | ($f_{P2W,idx}$, 0.5 × W) | — |
| | TVHT_2W + 2W | ($f_{c,idx0}$, 0.5 × W) | ($f_{c,idx1}$, 0.5 × W) |

In Table 6, when dot11CurrentChannelBandwidth=TVHT_2W+2W, $f_{PW,idx}=f_{c,idx0}$ in the channel bandwidth TVHT_W according to Equation 1. In addition, when dot11CurrentChannelBandwidth=TVHT_2W+2W, $f_{2PW,idx}=f_{c,idx0}$ in the channel bandwidth TVHT_2W according to Equation 2.

While a signal transmitted in TVHT_MODE_2N and TVHT_MODE_4N may suffer a phase offset or phase noise between two frequency segments in TVHT_MODE_2N or TVHT_MODE_4N, the phase offset or phase noise is not represented in Equation 3 for clarity.

Table 7 shows a tone scaling factor and guard interval duration with respect to PLCP fields. In Table 7, values $N_{Field}^{Tone}$ of various fields are arranged as a function of the number of BCUs (that is, TVHT_MODE_1 has a BCU, TVHT_MODE_2C and TVHT_MODE_2N have two BCUs and TVHT_MODE_4C and TVHT_MODE_4N have four BCUs).

TABLE 7

| | $N_{Field}^{Tone}$ | | | Guard |
|---|---|---|---|---|
| Field | Number of BCUs = 1 | Number of BCUs = 2 | Number of BCUs = 4 | interval duration |
| L-STF | 24 | 48 | 96 | — |
| L-LTF | 104 | 208 | 416 | $T_{GI2}$ |
| L-SIG | 104 | 208 | 416 | $T_{GI}$ |
| TVHT-SIG-A | 104 | 208 | 416 | $T_{GI}$ |
| TVHT-STF | 24 | 48 | 96 | — |
| TVHT-LTF | 114 | 228 | 456 | $T_{GI}$ |
| TVHT-SIG-B | 114 | 228 | 456 | $T_{GI}$ |
| TVHT-Data | 114 | 228 | 484 | $T_{GI}$ or $T_{GIS}$ |
| NON_HT_DUP_OFDM-Data | 104 | 208 | 416 | $T_{GI}$ |

In Table 7, NON_HT_DUP_OFDM-Data denotes a NON-NT PPDU having a format type of NON_HT_DUP_OFDM.

In Table 7, $T_{GI}$ denotes a normal guard interval duration (in microseconds) and $T_{GI2}$ represents a double guard interval value (double the normal guard interval duration). In TVHT-Data, $T_{GI}$ denotes a guard interval duration when GI_TYPE of the parameter TXVECTOR has a value LONG_GI and $T_{GIS}$ denotes a short guard interval duration when GI_TYPE of the parameter TXVECTOR has a value SHORT_GI.

A function $\gamma_{k,M}$ representing tone rotation can be defined as shown in Table 8. Table 8 shows transmission modes and $\gamma_{k,M}$.

TABLE 8

| Transmission mode | $\gamma_{k,M}$ |
|---|---|
| TVHT_MODE_1, TVHT_MODE_2N | $\gamma_{k,1}$ per segment |
| TVHT_MODE_2C, TVHT_MODE_4N | $\gamma_{k,2}$ for two contiguous segments |
| TVHT_MODE_4C | $\gamma_{k,4}$ |

With reference to Table 8, $\epsilon_{k,1}=1$ when k<0 and $\gamma_{k,1}=j$ when k≥0 for TVHT_MODE_1 and TVHT_MODE_2N PPDU transmission.

For TVHT_MODE_1 and TVHT_MODE_2N PPDU transmission, $\gamma_{k,2}=1$ when k<−72 and $\gamma_{k,2}=−1$ when k≥−72 in case of 6 MHz and 8 MHz channels, and $\gamma_{k,2}=1$ when $k<-84$ and $\gamma_{k,2}=-1$ when $k\geq-84$ in case of a 7 MHz channel.

For TVHT_MODE_4C PPDU transmission, $\gamma_{k,4}=1$ when $k<-216$, $\gamma_{k,4}=-1$ when $-216\leq k<0$, $\gamma_{k,4}=1$ when $0<k<72$ and $\gamma_{k,4}=-1$ when $k\geq72$ in case of 6 MHz and 8 MHz channels. In case of a 7 MHz, $\gamma_{k,4}=1$ when $k<-252$, $\gamma_{k,4}=-1$ when $-252\leq k<0$, $\gamma_{k,4}=1$ when $0<k<84$ and $\gamma_{k,4}=-1$ when $k\geq84$.

Channelization

A TVHT channel can be specified by fields for specifying a TVHT as shown Table 4.

W or TVHT_W is represented in MHz and can be defined as one of 6, 7 and 8 MHz according to regulatory domain. When the fields 'dot11CurrentChannelCenterFrequencyIndex0' and 'dot11CurrentChannelCenterFrequencyIndex1' are given, the center frequencies thereof are determined according to Equation 4.

Channel center frequency [MHz]=Channel start frequency+TVHT_W× dot11CurrentChannelCenterFrequencyIndex+ ChannelCenterFrequencyCorrection  [Equation 4]

In Equation 4, the channel start frequency is determined by a value defined in country information and operating classes (refer to Tables 9 to 12).

In Equation 4, 'dot11CurrentChannelCenterFrequencyIndex' corresponds to 'dot11CurrentChannelCenterFrequencyIndex0' or 'dot11CurrentChannelCenterFrequencyIndex1'.

In Equation 4, 'channelCenterFrequencyCorrection' can be defined as 0 for TVHT_MODE_1, 0.5×TVHT_W for TVHT_MODE_2C and TVHT_MODE_2N and 1.5× TVHT_W for TVHT_MODE_4C and TVHT_MODE_4N. Otherwise, 'channelCenterFrequencyCorrection' can be defined as 0 for TVHT_MODE_1 and TVHT_MODE_2N, 0.5×TVHT_W for TVHT_MODE_2C and TVHT_MODE_4N and 1.5×TVHT_W for TVHT_MODE_4C.

The channel start frequency is a frequency at which the channel number of the regulatory domain corresponds to a radio local area network (RLAN) channel number. That is, the channel start frequency is defined as the center frequency of the first channel. The channel start frequency is the center frequency of a channel corresponding to channel index 0 when the channel index is counted from 0 and corresponds to the center frequency of a channel corresponding to channel index 1 when the channel index is counted from 1.

For example, the center frequency of TV channel 2 of U.S. is 57 MHz. This is obtained according to Equation 4 as follows. As to US TV channel 2, the channel start frequency is 45 MHz (refer to Table 9), TVHT_W=6 MHz, and ChannelCenterFrequencyCorrection=0 in TVHT_MODE_1. Accordingly, the channel start frequency [MHz]=Channel start frequency+TVHT_W× dot11CurrentChannelCenterFrequencyIndex+ChannelCenterFrequencyCorrection=45+6×2+0=57 MHz.

Figure 9:
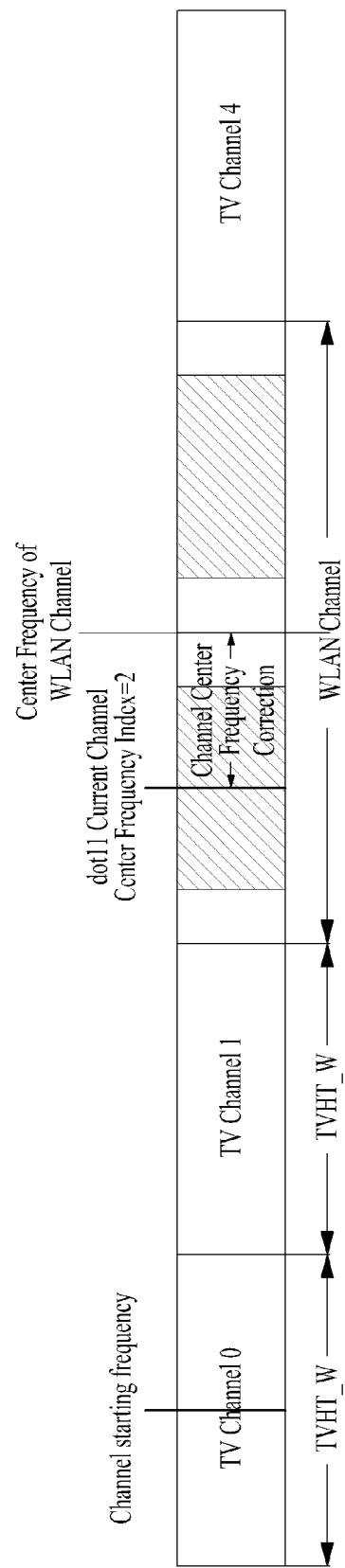
FIG. 9 illustrates TVHT channelization.

FIG. 9 illustrates TVHT channelization.

An available channel list in a TVWS band is determined based on TV channel numbers and a WLAN channel (or WLAN operation channel) can be determined in consideration of the available channel list. FIG. 9 assumes a case in which TV channel indices 0 to 4 are available in an available channel list and a WLAN channel corresponding to channel indices 2 and 3 is configured. That is, it is assumed that the WLAN channel has a channel width of TVHT_2W and a PPDU is transmitted according to TVHT_MODE_2C operation.

In this case, the channel center frequency is 0.045 GHz, that is, 45 MHz, as described above (refer to Table 9). As described above with reference to Table 4, 'dot11CurrentChannelCenterFrequencyIndex' denotes the center frequency of a lowest TV channel of a frequency segment (i.e. a unit composed of two BCUs). In the example of FIG. 9, when 'dot11CurrentChannelCenterFrequencyIndex'=2, the index (i.e. TV channel number) of the center frequency of the lowest TV channel from among TV channels included in a frequency segment of the WLAN channel is 2.

In the example of FIG. 9, since the WLAN channel is composed of the frequency segment including two contiguous BCUs, the center frequency of the WLAN channel can be calculated based on Equation 4. Channel start frequencies of US TV channels 2 and 3 correspond to 45 MHz (refer to Table 9), TVHT_W=6 MHz, and 'ChannelCenterFrequencyCorrection'=0.5×TVHT_W=3 in TVHT_MODE_2C. Accordingly, it can be confirmed that Channel center frequency [MHz]=Channel start frequency+TVHT_W× dot11CurrentChannelCenterFrequencyIndex+ChannelCenterFrequencyCorrection=45+6×2+3=60 MHz.

In the example of FIG. 9, only part of the frequency band of a TV channel is used for the WLAN channel because requirement for an adjacent channel leakage power ratio (ACLR) is strict. Furthermore, when different bandwidths of different BSSs coexist, complexity and costs necessary for an STA to support the different bandwidths increase. To solve this, a WLAN channel is located in the middle of a TVH channel. Accordingly, a single BCU is located in the middle of a single TV channel in the example of FIG. 9. When the number of subcarriers of a TV channel is 144, the number of subcarriers occupied by a BCU can be 128.

The center frequency of the primary TVHT_W channel can be determined according to Equation 5.

Primary channel center frequency [MHz]=Channel start frequency+TVHT_W× dot11CurrentPrimaryChannel  [Equation 5]

Any two non-identical channels can be used in TVHT_MODE_2N operation.

In TVHT_MODE_4N operation, two arbitrary channels permitted as a TVHT_2W channel can be used. The center frequencies of these two channels need to be largely separated from each other, compared to TVHT_2W. That is, the difference between 'dot11CurrentChannelCenterFrequencyIndex0' and 'dot11CurrentChannelCenterFrequencyIndex1' needs to correspond to a frequency difference larger than 2.

For example, a US channel specified by dot11CurrentChannelBandwidth=TVHT_2W (12 MHz), dot11CurrentChannelCenterFrequencyIndex0=15 and dot11CurrentPrimaryChannel=16 is assumed. This channel has a bandwidth of 12 MHz, center frequency of 482 MHz and primary 6 MHz channel center frequency of 485 MHz (refer to Equations 4 and 5 and Table 9).

Alternatively, a US channel specified by dot11CurrentChannelBandwidth=TVHT_4W (24 MHz), dot11CurrentChannelCenterFrequencyIndex0=14 and dot11CurrentPrimaryChannel=17 is assumed. This channel has a bandwidth of 24 MHz, center frequency of 482 MHz and primary 6 MHz channel center frequency of 491 MHz (refer to Equations 4 and 5 and Table 9).

Alternatively, a US channel specified by dot11CurrentChannelBandwidth=TVHT_2W+2W (12+12 MHz), dot11CurrentChannelCenterFrequencyIndex0=15, dot11CurrentPrimaryChannel=40 and dot11CurrentPrimaryChannel=16 is assumed. For this channel, the bandwidth is 12+12 MHz, the bandwidth of frequency segment 0 is 12 MHz, the center frequency of frequency segment 0 is 482 MHz, the bandwidth of frequency segment 1 is 12 MHz, the center frequency of frequency segment 1 is 632 MHz, and the center frequency of the primary 6 MHz channel is 485 MHz (refer to Equations 4 and 5 and Table 9).

Country Information and Operating Classes

A country element includes information necessary for an STA to set the PHY and MAC thereof such that the PHY and MAC operate when an operating triplet is present. The operating triplet can include operating extension identifier, operating class and coverage class fields.

The operating class is an index indicating a set of values for radio operation in the regulatory domain. The following tables (Tables 9 to 12) showing the operating class include information that represents additional operation requirements for behaviors and signal detection limits. That is, the operating class can be composed of a channel start frequency, a channel spacing, a channel set and a behavior limit set.

In the operating class, the channel start frequency is a variable provided for each channel number and has a frequency value. The channel start frequency can be used with a channel number to calculate a channel center frequency. The channel spacing refers to a difference between center frequencies of non-overlapping adjacent channels when a maximum bandwidth permitted in the corresponding operating class is used. The channel set is a list of legal integer channel numbers in the corresponding regulatory domain and class. The behavior limit set refers to behavior limits (refer to Annex D of IEEE 802.11 standard documents) defined in various regulatory domains.

Tables 9 to 12 show operating classes of U.S., Europe, Japan and a global operating class. Definition of the operating class can be corrected or superseded according to change in regulations of an area or country.

TABLE 9

| Operating class | Global operating class (Table 12) | Channel start frequency (GHz) | Channel spacing (MHz) | Channel set | Channel center frequency index | Behavior limits set |
| --- | --- | --- | --- | --- | --- | --- |
| <ANA> | | 0.045 (channels 2-4), 0.049 (channels 5, 6), 0.135 (channels 7-13) or 0.389 (channels 14-51) | 6 | — | — | GeoDB |
| <ANA+1> | | 0.045 (channels 2-4), 0.049 (channels 5, 6), 0.135 (channels 7-13) or 0.389 (channels 14-51) | 12 | — | — | GeoDB |
| <ANA+2> | | 0.135 (channels 7-13) or 0.389 (channels 14-51) | 24 | — | — | GeoDB |

TABLE 10

| Operating class | Global operating class (Table 12) | Channel start frequency (GHz) | Channel spacing (MHz) | Channel set | Channel center frequency index | Behavior limits set |
| --- | --- | --- | --- | --- | --- | --- |
| <ANA> | | | | 7, 8 | — | GeoDB |
| <ANA+1> | | | | 14, 16 | — | GeoDB |
| <ANA+2> | | | | 28, 32 | — | GeoDB |

TABLE 11

| Operating class | Global operating class (Table 12) | Channel start frequency (GHz) | Channel spacing (MHz) | Channel set | Channel center frequency index | Behavior limits set |
| --- | --- | --- | --- | --- | --- | --- |
| <ANA> | | 0.087 (channels 1-3), | 6 | — | — | GeoDB |

TABLE 11-continued

| Operating class | Global operating class (Table 12) | Channel start frequency (GHz) | Channel spacing (MHz) | Channel set | Channel center frequency index | Behavior limits set |
|---|---|---|---|---|---|---|
| <ANA+1> | | 0.149 (channels 4-12), or 0.395 (channels 13-62) 0.087 (channels 1-3), 0.149 (channels 4-12), or 0.395 (channels 13-62) | 12 | — | — | GeoDB |
| <ANA+2> | | 0.149 (channels 4-12) or 0.395 (channels 13-62) | 24 | — | — | GeoDB |

TABLE 12

| Operating class | Nonglobal operating class(es) | Channel start frequency (GHz) | Channel spacing (MHz) | Channel set | Channel center frequency index | Behavior limits set |
|---|---|---|---|---|---|---|
| <ANA> | <ANA> | | 6, 7, 8 | — | — | GeoDB |
| <ANA+1> | <ANA+1> | | 12, 14, 18 | — | — | GeoDB |
| <ANA+2> | <ANA+2> | | 24, 28, 32 | — | — | GeoDB |

As can be seen from Table 9, the channel start frequency of TV channels #2, #3 and #4 is different from the channel start frequency of TV channels #5 and #6 in the case of U.S. In addition, the channel start frequency of TV channels #5 and #6 is different from the channel start frequency of TV channels #7 to #13 and the channel start frequency of TV channels #7 to #13 is different from the channel start frequency of TV channels #14 to #51. This is because TV channels #4 and #5 are separated from each other in terms of frequency, TV channels #6 and #7 are separated from each other in terms of frequency, and TV channels #13 and #14 are separated from each other in terms of frequency (the band between TV channels #4 and #5, the band between TV channels #6 and #7 and the band between TV channels #13 and #14 are defined for various other purposes (e.g. an amateur radio band, international FM radio band, marine VHF radio band, etc.)).

To represent the center frequency of a WLAN channel, a channel start frequency value needs to be given, as described above with reference to Equation 4. However, it is not possible to apply the same channel start frequency to all TV channels because TV channels are not contiguous in terms of frequency, as described above.

Figure 10:
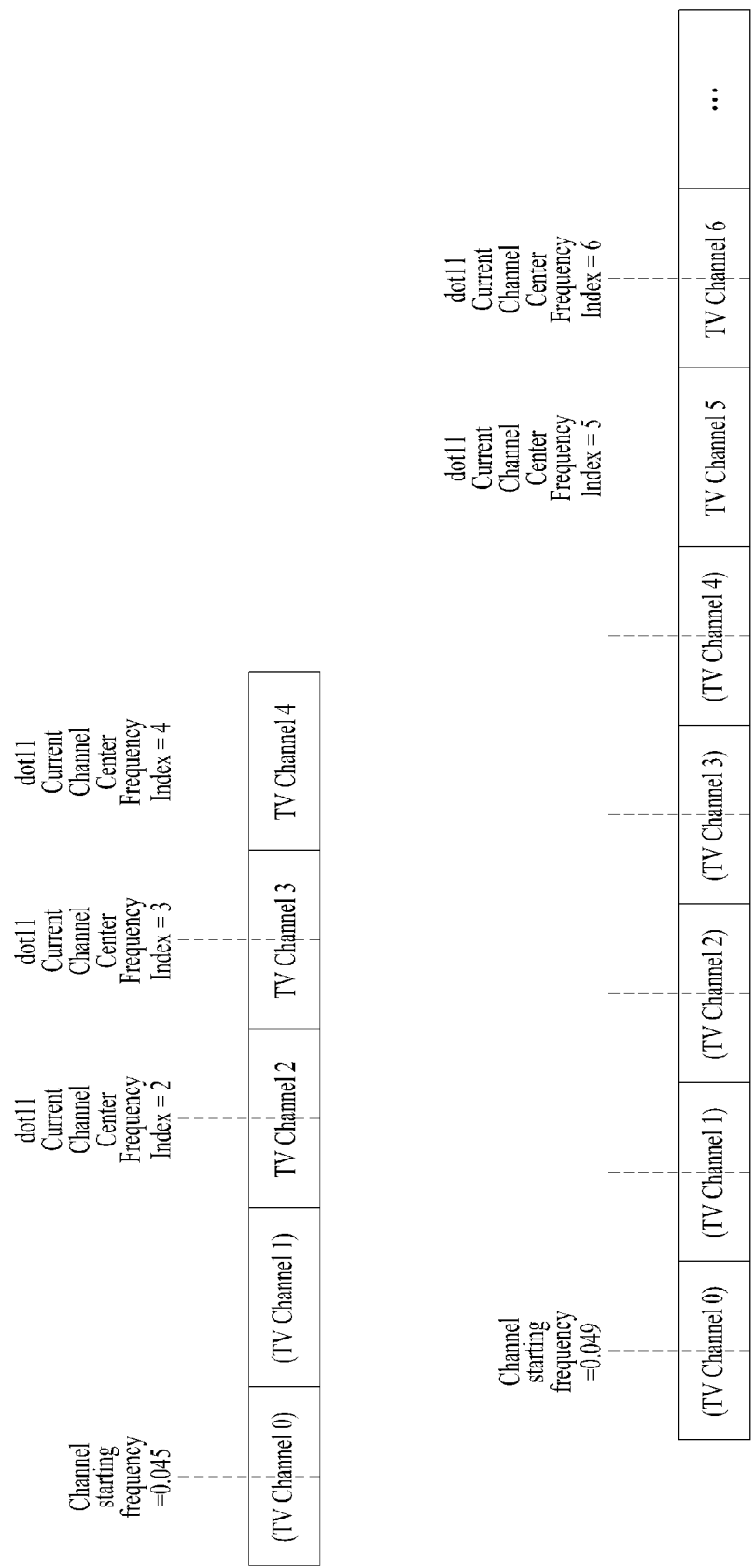
FIG. 10 illustrates frequency positions of TV channels.

FIG. 10 illustrates exemplary frequency positions of TV channels.

In FIG. 10, to represent the center frequency of a WLAN channel including a frequency segment present in a frequency band corresponding to TV channel #4 (refer to Equation 4), a channel start frequency is given as 0.045 GHz. The channel start frequency (=45 MHz) corresponds to the center frequency of TV channel #0 when it is assumed that TV channels #0 to #4 are contiguously present when a TV channel width is 6 MHz on the basis of the center frequency (=69 MHz) of TV channel #4 (that is, the center frequency of TV channel #3 is 63 MHz, the center frequency of TV channel #2 is 57 MHz, the center frequency of virtual TV channel #1 is 51 MHz and the center frequency of virtual TV channel #0 is 45 MHz).

Similarly, to represent the center frequency of a WLAN channel including a frequency segment present in a frequency band corresponding to TV channel #5 (refer to Equation 4), the channel start frequency is given as 0.049 GHz. The channel start frequency (=49 MHz) corresponds to the center frequency of TV channel #0 when it is assumed that TV channels #0 to #5 are contiguously present when a TV channel width is 6 MHz on the basis of the center frequency (=79 MHz) of TV channel #5 (that is, the center frequency of virtual TV channel #4 is 73 MHz, the center frequency of virtual TV channel #3 is 67 MHz, the center frequency of virtual TV channel #2 is 61 MHz and the center frequency of virtual TV channel #0 is 49 MHz).

That is, a channel start frequency applied to a TV channel in Table 9 corresponds to the center frequency of the first virtual channel (e.g. virtual TV channel #0 when the TV channel index is counted from 0) in the TV channel.

In TVHT channelization proposed by the present invention, the channel start frequency is varied according to 'dot11CurrentChannelCenterFrequencyIndex', as shown in Tables 9 to 12, and the center frequency of a WLAN operation channel is determined based on 'dot11CurrentChannelCenterFrequencyIndex' and the channel start frequency, as represented by Equation 4.

For example, it is assumed that dot11CurrentChannelBandwidth=TVHT_W+W (6+6 MHz), dot11CurrentChannelCenterFrequencyIndex0=4 and dot11CurrentChannelCenterFrequencyIndex1=6 in the U.S.

In this case, the channel start frequency of the first channel (i.e. dot11CurrentChannelCenterFrequencyIndex0=4) is 0.045×

1000=45 MHz according to Table 9 and the center frequency thereof is 45+6×4+0=69 MHz according to Equation 4.

The channel start frequency of the second channel (i.e. dot11CurrentChannelCenterFrequencyIndex1=6) is 0.049× 1000=49 MHz according to Table 9 and the center frequency thereof is 49+6×6+0=85 MHz according to Equation 4.

That is, the channel start frequency is defined as a function of 'dot11CurrentChannelCenterFrequencyIndex', as described above with reference to Tables 9 to 12 and FIG. 10. The relationship between the channel start frequency and 'dot11CurrentChannelCenterFrequencyIndex' can be defined according to regulatory domain and examples thereof are as shown in Tables 9 to 12.

Figure 11:
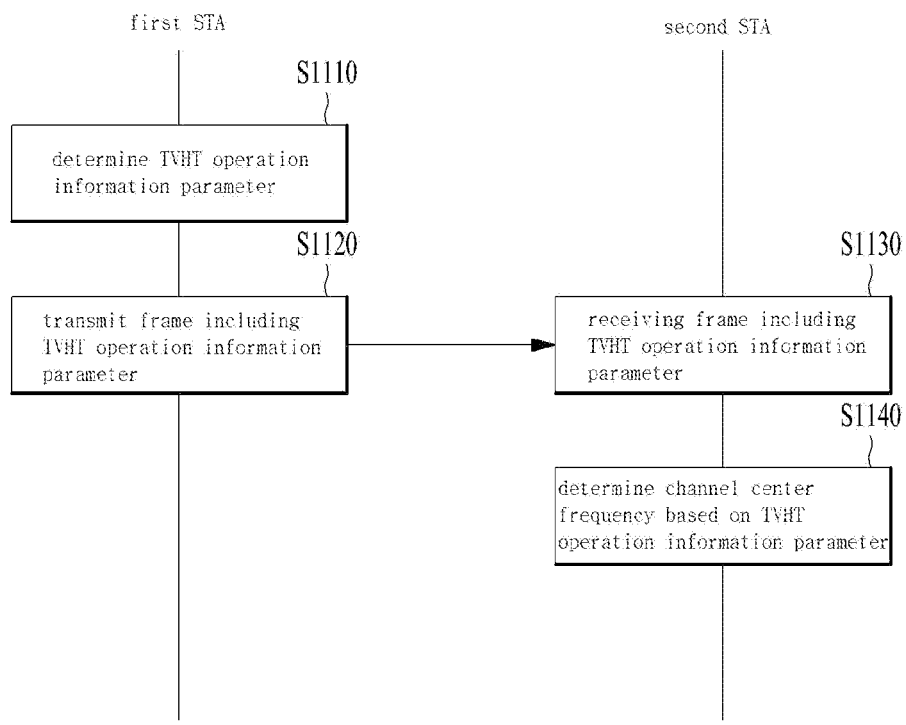
FIG. 11 illustrates an operation of an STA according to an embodiment of the present invention.

FIG. 11 illustrates an operation of an STA according to an embodiment of the present invention.

A first STA (e.g. AP STA) can determine a TVHT operation information parameter in step S1110. TVHT operation information may correspond to the TVHT operation information field described above with reference to FIG. 7.

The first STA can transmit a frame including the TVHT operation information field to a second STA in step S1120 and the second STA can receive the frame in step S1130.

The second STA can determine the center frequency of an operation channel from the received TVHT operation information field in step S1140. Accordingly, channelization of an STA operating in a TVHT BSS can be performed.

In the TVHT operation information transmission/reception and channelization method described with reference to FIG. 11, the above-described embodiments of the present invention can be independently applied or two or more embodiments can be simultaneously applied.

Figure 12:
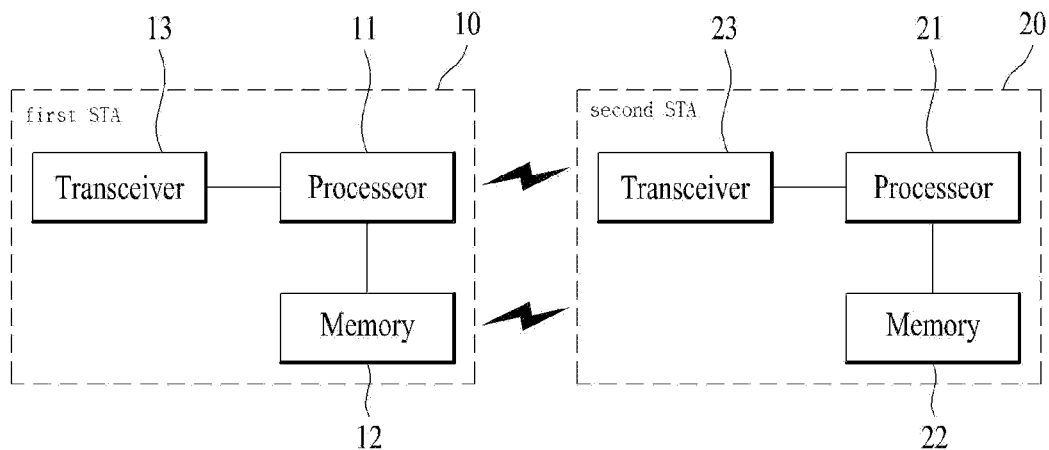
FIG. 12 illustrates a configuration of an RF device according to an embodiment of the present invention.

FIG. 12 illustrates a configuration of an RF device according to an embodiment of the present invention.

A first STA 10 may include a processor 11, a memory 12 and a transceiver 13. A second STA 20 may include a processor 21, a memory 22 and a transceiver 23. The transceiver 13 and 23 can transmit/receive a radio signal and implement a physical layer according to IEEE 802, for example. The processor 11 and 21 can be connected to the transceiver 13 and 23 to implement the physical layer and/or an MAC layer according to IEEE 802. The processor 11 and 21 can be configured to perform operations according to the above-described embodiments of the present invention. Modules for implementing operations of the first and second STAs according to the above-described embodiments of the present invention can be stored in the memory 12 and 22 and executed by the processor 11 and 21. The memory 12 and 22 can be included in the processor 11 and 21 or provided outside the processor 11 and 21 and connected to the processor 11 and 21 through known means.

The processor 11 of the first STA 10 according to an embodiment of the present invention can be configured to transmit a frame including the TVHT operation information field to the second STA 20 using the transceiver 12. The processor 11 of the first STA 10 can configure the TVHT operation information field, as described above with reference to FIG. 7 and each subfield included in the TVHT operation information field can be configured according to the above-described embodiments of the present invention.

The processor 21 of the second STA 20 according to an embodiment of the present invention can be configured to receive the frame including the TVHT operation information field from the first STA 10. The processor 21 of the second STA 20 can be configured to perform channelization such as determination of the center frequency of an operation channel using set values of subfields included in the received TVHT operation information field and to carry out MAC and/or PHY operations according to channelization.

The configuration of the first STA 10 and the second STA 20 can be implemented such that the above-described embodiments of the present invention are independently applied or two or more embodiments are simultaneously applied and descriptions of redundant parts are omitted for clarity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described embodiments of the present invention focus on IEEE 802.11, they are applicable to various mobile communication systems in the same manner.

What is claimed is:

1. A method for providing whitespace operation information, the method comprising:
   transmitting, by a first station (STA) to a second STA, a frame including a TV whitespace high throughput (TVHT) operation information field,
   wherein the TVHT operation information field includes a primary channel number, a channel width, a channel center frequency segment 0 and a channel center frequency segment 1 subfields,
   wherein:
      a channel center frequency of a frequency segment 0 is determined based on a function of a channel start frequency and a TV channel index corresponding to the frequency segment 0, and
      a channel center frequency of a frequency segment 1 is determined based on the function of the channel start frequency and a TV channel index corresponding to the frequency segment 1 respectively,
   wherein the TV channel index corresponding to the frequency segment 0 indicates the index of a lowest TV channel in an operating channel when the channel width corresponds to two contiguous basic channel units (BCUs) or four contiguous BCUs, and
   wherein the TV channel index corresponding to the frequency segment 0 indicates the index of a lowest TV channel in the frequency segment 0, and the TV channel index corresponding to the frequency segment 1 indicates the index of a lowest TV channel in the frequency segment 1, when the channel width corresponds to two non-contiguous BCUs or four non-contiguous BCUs.

2. The method according to claim 1, wherein the channel start frequency is set to a center frequency of a TV channel corresponding to a 0-th TV channel index on the basis of the TV channel index corresponding to the frequency segment 0 or the TV channel index corresponding to the frequency segment 1.

3. The method according to claim 1, wherein the frequency segment 0 is a frequency segment including a primary channel.

4. The method according to claim 1, wherein the frequency segment 1 is a frequency segment that does not include a primary channel.

5. The method according to claim 1, wherein:

Channel center frequency=Channel starting frequency+TVHT_W×dot11CurrentChannelCenterFrequencyIndex+ChannelCenterFrequencyCorrection, where:
Channel center frequency is the center frequency of a channel,
Channel starting frequency is the channel start frequency,
TVHT_W denotes one BCU,
dot11CurrentChannelCenterFrequencyIndex is the TV channel index corresponding to the frequency segment 0 or the TV channel index corresponding to the frequency segment 1, and
ChannelCenterFrequencyCorrection is a predetermined correction value.

6. The method according to claim 5, wherein:
the predetermined correction value is 0 if a PPDU (Physical layer convergence procedure (PLCP) Protocol Data Unit) is transmitted using a BCU or two non-contiguous BCUs;
the predetermined correction value is 0.5×TVHT_W if the PPDU is transmitted using two contiguous BCUs or two non-contiguous frequency segments;
the predetermined correction value is 1.5×TVHT_W if the PPDU is transmitted using four contiguous BCUs; and
each frequency segment includes two contiguous BCUs.

7. The method according to claim 1, wherein:
the TVHT operation information field has a size of 4 octets;
each of the primary channel number, the channel width, the channel center frequency segment 0; and
the channel center frequency segment 1 subfields has a size of 1 octet.

8. The method according to claim 1, wherein:
the first STA is an access point (AP) STA; and
the second STA is a non-AP STA.

9. A method for receiving whitespace operation information, the method comprising:
receiving, by a second station (STA) from a first STA, a frame including a TVHT operation information field, wherein the TVHT operation information field includes a primary channel number, a channel width, a channel center frequency segment 0, and a channel center frequency segment 1 subfields,
wherein:
a channel center frequency of a frequency segment 0 is determined based on a function of a channel start frequency and a TV channel index corresponding to the frequency segment 0, and
a channel center frequency of a frequency segment 1 is determined based on the function of the channel start frequency and a TV channel index corresponding to the frequency segment 1 respectively,
wherein the TV channel index corresponding to the frequency segment 0 indicates the index of a lowest TV channel in an operating channel when the channel width corresponds to two contiguous basic channel units (BCUs) or four contiguous BCUs, and
wherein the TV channel index corresponding to the frequency segment 0 indicates the index of a lowest TV channel in the frequency segment 0, and the TV channel index corresponding to the frequency segment 1 indicates the index of a lowest TV channel in the frequency segment 1, when the channel width corresponds to two non-contiguous BCUs or four non-contiguous BCUs.

10. A station (STA) device providing whitespace operation information, comprising:
a transceiver; and
a processor configured to:
control the transceiver; and
control the STA device to transmit a frame including a TVHT operation information field to another STA device using the transceiver,
wherein the TVHT operation information field includes a primary channel number, a channel width, a channel center frequency segment 0, and a channel center frequency segment 1 subfields,
wherein:
a channel center frequency of a frequency segment 0 is determined based on a function of a channel start frequency and a TV channel index corresponding to the frequency segment 0, and
a channel center frequency of a frequency segment 1 is determined based on the function of the channel start frequency and a TV channel index corresponding to the frequency segment 1 respectively,
wherein the TV channel index corresponding to the frequency segment 0 indicates the index of a lowest TV channel in an operating channel when the channel width corresponds to two contiguous basic channel units (BCUs) or four contiguous BCUs, and
wherein the TV channel index corresponding to the frequency segment 0 indicates the index of a lowest TV channel in the frequency segment 0, and the TV channel index corresponding to the frequency segment 1 indicates the index of a lowest TV channel in the frequency segment 1, when the channel width corresponds to two non-contiguous BCUs or four non-contiguous BCUs.

11. A station (STA) device receiving whitespace operation information, comprising:
a transceiver; and
a processor configured to:
control the transceiver; and
control the STA device to receive a frame including a TVHT operation information field from another STA device using the transceiver,
wherein the TVHT operation information field includes a primary channel number, a channel width, a channel center frequency segment 0, and a channel center frequency segment 1 subfields,
wherein:
a channel center frequency of a frequency segment 0 is determined based on a function of a channel start frequency and a TV channel index corresponding to the frequency segment 0, and
a channel center frequency of a frequency segment 1 is determined based on the function of the channel start frequency and a TV channel index corresponding to the frequency segment 1 respectively,
wherein the TV channel index corresponding to the frequency segment 0 indicates the index of a lowest TV channel in an operating channel when the channel width corresponds to two contiguous basic channel units (BCUs) or four contiguous BCUs, and
wherein the TV channel index corresponding to the frequency segment 0 indicates the index of a lowest TV channel in the frequency segment 0, and the TV channel index corresponding to the frequency segment 1 indicates the index of a lowest TV channel in the frequency segment 1, when the channel width corresponds to two non-contiguous BCUs or four non-contiguous BCUs.

* * * * *